United States Patent
Born et al.

(10) Patent No.: US 10,592,442 B2
(45) Date of Patent: Mar. 17, 2020

(54) ASYNCHRONOUS BUFFER WITH POINTER OFFSETS

(71) Applicant: ADVANCED MICRO DEVICES, INC., Santa Clara, CA (US)

(72) Inventors: Richard Martin Born, Fort Collins, CO (US); David M. Dahle, Fort Collins, CO (US); Steven Kommrusch, Fort Collins, CO (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 15/837,951

(22) Filed: Dec. 11, 2017

(65) Prior Publication Data

US 2019/0179777 A1    Jun. 13, 2019

(51) Int. Cl.
   *G06F 13/16*   (2006.01)
   *G06F 5/14*    (2006.01)
   *G06F 13/42*   (2006.01)

(52) U.S. Cl.
   CPC ........... *G06F 13/161* (2013.01); *G06F 5/14* (2013.01); *G06F 13/1673* (2013.01); *G06F 13/4239* (2013.01); *G06F 2205/126* (2013.01)

(58) Field of Classification Search
   CPC ........... G06F 13/161; G06F 13/1673; G06F 13/4239; G06F 5/14
   See application file for complete search history.

(56) References Cited

U.S. PATENT DOCUMENTS

| | | | |
|---|---|---|---|
| 5,138,637 A * | 8/1992 | Fox ................ | G06F 5/065 370/517 |
| 6,233,629 B1 * | 5/2001 | Castellano ........ | G06F 5/06 710/29 |
| 7,287,105 B1 * | 10/2007 | Owen ............. | G06F 1/12 365/189.08 |
| 7,519,788 B2 | 4/2009 | LaBerge | |
| 8,270,552 B1 | 9/2012 | Oner | |
| 2002/0087909 A1 * | 7/2002 | Hummel .......... | G06F 13/4217 713/400 |
| 2004/0001014 A1 | 1/2004 | Oberai et al. | |
| 2008/0288805 A1 * | 11/2008 | Osborn ........... | G06F 5/06 713/400 |

(Continued)

FOREIGN PATENT DOCUMENTS

WO    2014135369 A1    9/2014

OTHER PUBLICATIONS

Cliff Cummings, "Simulation and Synthesis Techniques for Asynchronous FIFO Design", SNUG San Jose 2002, 23 pages.

(Continued)

*Primary Examiner* — Nimesh G Patel

(57) ABSTRACT

A processor applies offset values to read and write pointers to a first-in-first-out buffer (FIFO) for data being transferred between clock domains. The pointer offsets are based on a frequency ratio between the clock domains, and reduce latency while ensuring that data is not read by the receiving clock domain from an entry of the FIFO until after the data has been written to the entry, thereby reducing data transfer errors. The processor resets the pointer offset values in response to a change in clock frequency at one or both of the clock domains, allowing the processor to continue to accurately transfer data in response to clock frequency changes.

20 Claims, 5 Drawing Sheets

(56) References Cited

U.S. PATENT DOCUMENTS

2009/0185695 A1  7/2009 Marton et al.
2014/0126303 A1* 5/2014 Mutchnik ................ G06F 5/00
                                                365/189.05

OTHER PUBLICATIONS

International Search Report and Written Opinion dated Jan. 7, 2019 for Application No. PCT/US2018/052378, 14 pages.

* cited by examiner

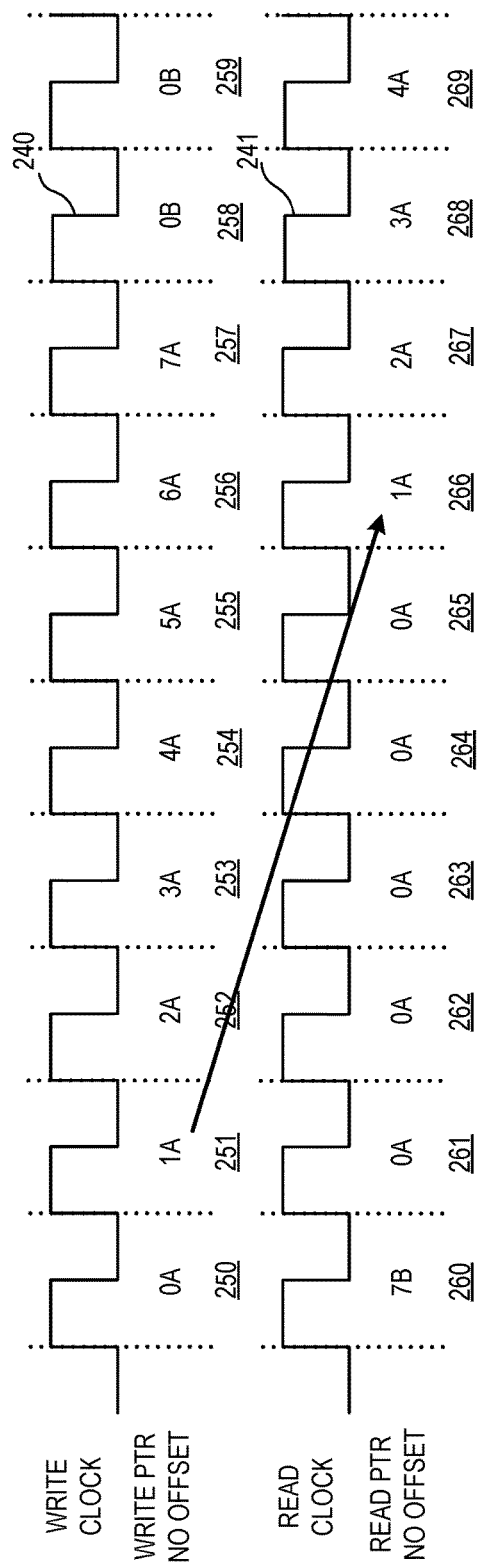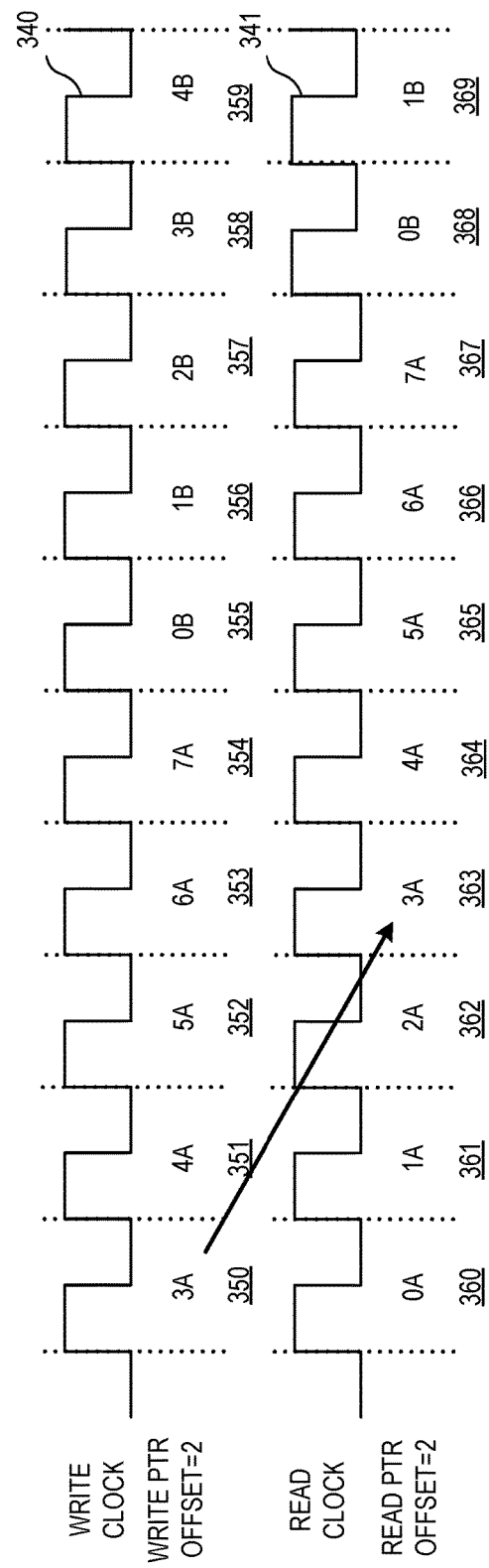

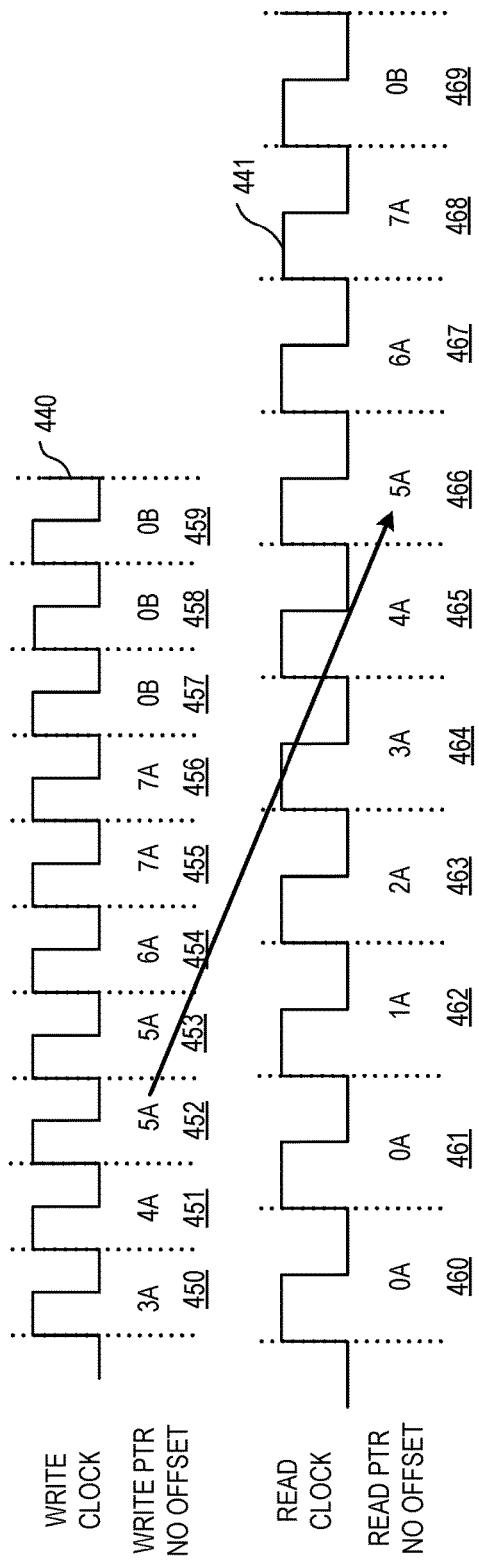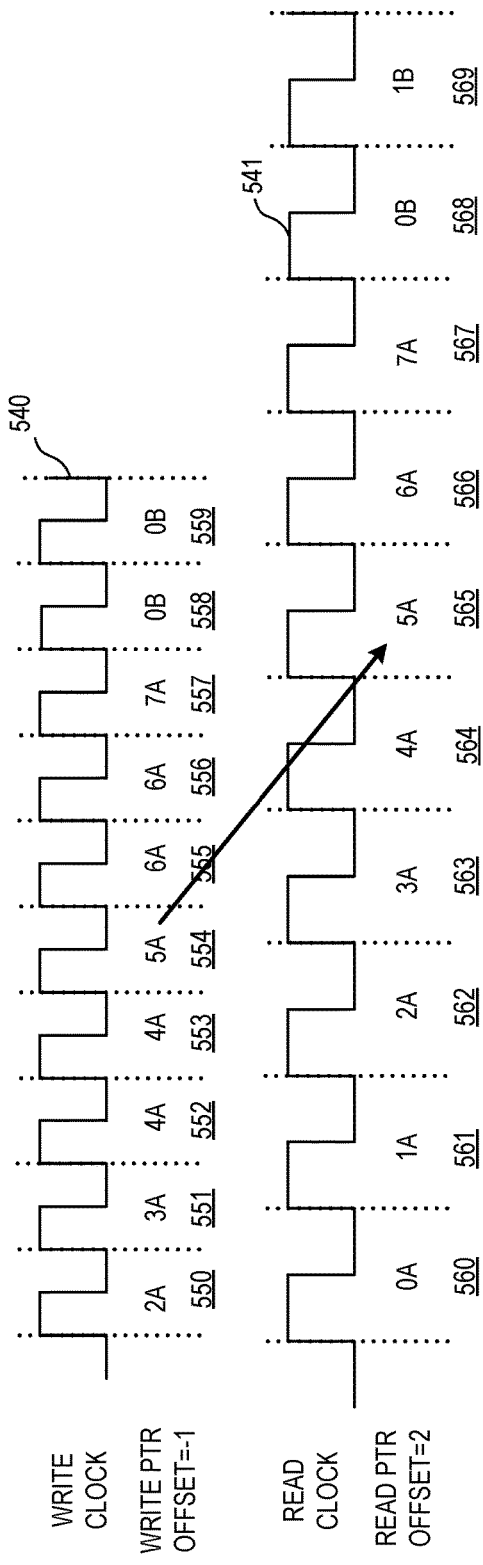

ASYNCHRONOUS BUFFER WITH POINTER OFFSETS

BACKGROUND

A processor typically employs one or more clock signals to synchronize logic operations at modules of the processor, thereby preventing errors such as setup errors, race conditions, and the like. A typical processor employs different clock signals for different portions of the processor, wherein each processor portion is referred to as a clock domain. The clock signals for the different clock domains are relatively independent of each other, allowing the logic operations of different clock domains to be synchronized independently of other clock domains. For example, the processor can synchronize the different clock domains with clock signals of different frequencies, thereby improving processing efficiency. Further, the independence of the clock signals supports simplified clock management and signal routing at the processor. However, in many instances data must be communicated between modules of different clock domains, whereby such communication can cause meta-stability errors in the data. These errors can be ameliorated by including a meta-stability circuit, such set of flip-flops (referred to as a synchronizer), between the clock domains to effectuate data transfers. However, such meta-stability circuits can add latency and therefore negatively impact processing efficiency. The errors can also be reduced by employing a first-in first-out buffer (FIFO) to transfer data across clock domains, but asynchronous FIFOs suffer from low bandwidth and high latency.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 2 is a diagram illustrating the FIFO controller of FIG. 1 applying no offset for a write or read pointer for data transfer between clock domains having equal clock frequencies at a FIFO in accordance with some embodiments.

FIG. 3 is a diagram illustrating the FIFO controller of FIG. 1 applying a write offset and a read offset for a data transfer between clock domains having equal clock frequencies at a FIFO in accordance with some embodiments.

FIG. 4 is a diagram illustrating the FIFO controller of FIG. 1 applying no offset for a write or read pointer for data transfer between write clock and read clock domains, wherein the write clock has a frequency 50% higher than the read clock, at a FIFO in accordance with some embodiments.

FIG. 5 is a diagram illustrating the FIFO controller of FIG. 1 applying a write offset and a read offset for a data transfer between write clock and read clock domains, wherein the write clock has a frequency 50% higher than the read clock, at a FIFO in accordance with some embodiments.

DETAILED DESCRIPTION

Figure 1:
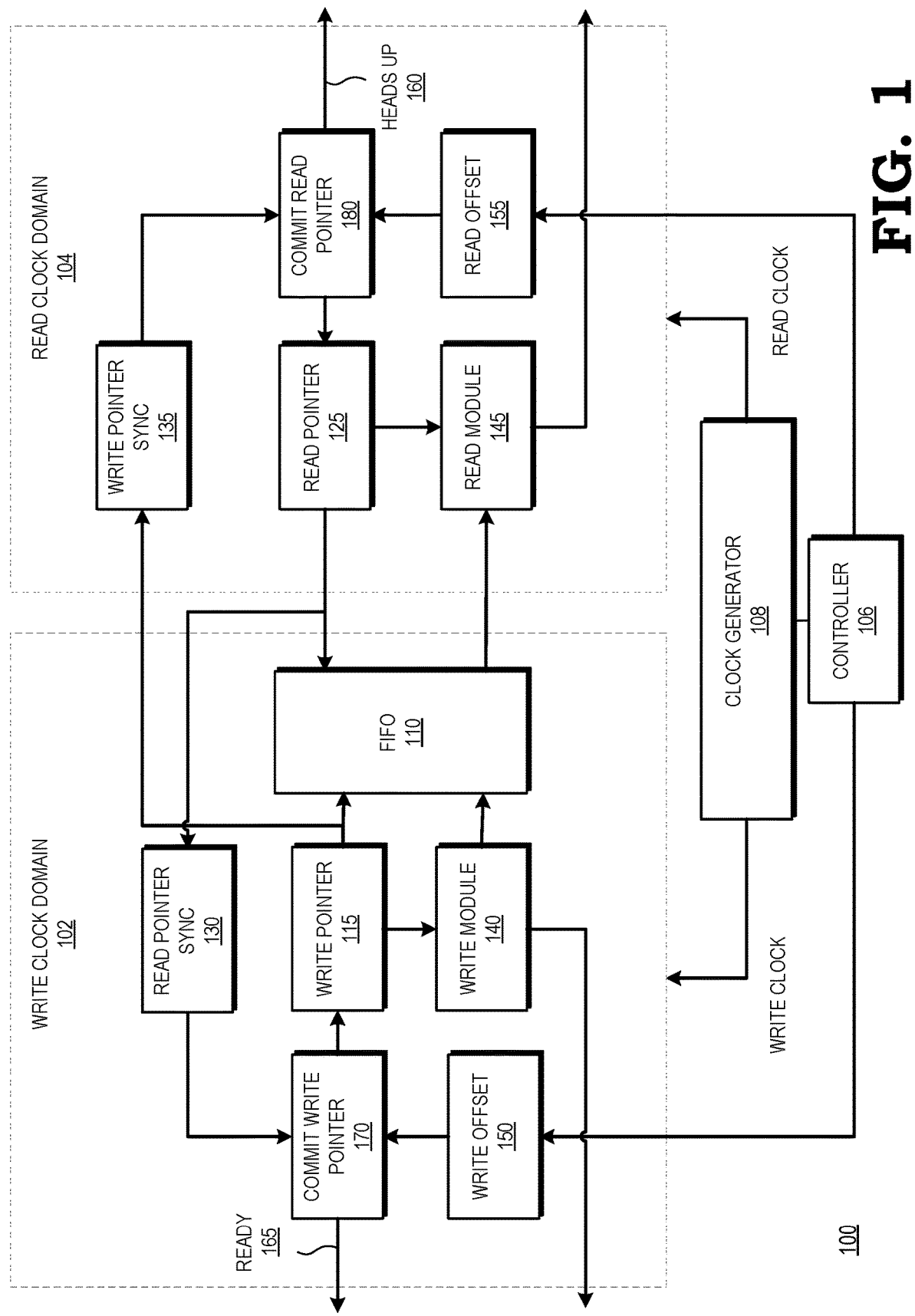
FIG. 1 is a block diagram of a processor that applies offset values to read and write pointers for a FIFO that supports data transfer between clock domains in accordance with some embodiments.

FIGS. 1-7 illustrate techniques for applying offset values to read and write pointers to a FIFO for data being transferred between clock domains of a processor based on a frequency ratio between the clock domains, allowing data to be written to or read from the FIFO at a faster rate than that governed by meta-stability circuitry associated with the read and write pointers. The processor employs one or more controllers that set and apply pointer offsets in each of the clock domains to reduce latency while ensuring that data is not read by the receiving clock domain from an entry of the FIFO until after the data has been written to the entry, thereby reducing data transfer errors. Further, the controller resets the pointer offset values in response to a change in clock frequency at one or both of the clock domains. By employing the one or more controllers to set and apply pointer offset values, the processor continues to accurately transfer data in response to clock frequency changes, while reducing latency and maximizing bandwidth. The processor enhances processing efficiency while supporting accurate data transfer between the clock domains.

To illustrate, the processor includes a first-in first out queue (FIFO) having multiple entries to store data transferred between two different clock domains. Each clock domain includes a controller to manage a set of pointers to access the FIFO. Conventionally, the read and write pointers are transferred across the clock domains via a meta-stability circuit to ensure that data is not written to or read from a FIFO entry until a read or write of the entry has been completed. However, the timing and configuration of the meta-stability circuit is based on an assumed "worst-case" relationship between the clock signals of the different clock domains. Furthermore, because the frequencies of the different clock signals vary over time based on changing operating requirements of the processor, the assumed worst-case relationship is too conservative in many cases, negatively impacting processing efficiency. Using the techniques described herein, the FIFO controller applies a non-zero offset value to one or more of the read and write pointers based on the frequencies of the clock signals of the different clock domains, thereby allowing the FIFO to be read or written more quickly. The controller thereby ensures that a lower latency is established for data written to the FIFO before that data is read. For example, for some embodiments in which the frequencies of the clock domains are equal, the controller sets a positive write pointer offset value and a positive read pointer offset value that reduce the latency of the FIFO by several clock cycles. In some embodiments, the frequency of the write clock is higher than the frequency of the read clock, and the controller sets a negative offset value for the write pointer to reduce the time entries sit in the FIFO and a positive offset value for the read pointer to prevent the read side from stalling as it waits for the pointers to synchronize, resulting in reduced latency and increased bandwidth. Both clock domains of the FIFO move their read and write pointers at constant rates, even if there is no data to transfer, based on the known frequency (or period) ratio. The constancy of the transfer rate allows the application of appropriate offsets that would otherwise be unsafe if the frequencies were unknown or fluctuating beyond margined limits. To determine the offset values, the controller compares the frequencies of the clock domains in view of the FIFO depth, synchronizer depth, delays due to signals indicating readiness of a write module to write to and a read module to read from the FIFO (ready and heads up depths), and required margining. As described further herein, by employing a controller to offset the write and read pointer positions, the processor reduces the latency of the flow of data across the clock domains.

FIG. 1 illustrates a processor 100 that applies offset values to read and write pointers to a FIFO for data being transferred between clock domains of a processor based on a frequency ratio between the clock domains, and resets the offset values in response to a frequency change in a clock signal for at least one of the clock domains in accordance with some embodiments. The processor 100 is implemented by any of a variety of compute-enabled electronic devices, such as a server, a desktop computer, a notebook computer, a tablet computer, a compute-enabled portable cellular phone (e.g., a "smart phone"), a compute-enabled watch or other wearable item, a personal digital assistant (PDA), a gaming console, and the like. In the depicted example, the processor 100 includes two clock domains, designated write clock domain 102 and read clock domain 104. The write clock domain 102 includes a write module 140 associated with operations of a processor core (not shown). The read clock domain 104 includes a read module 145 associated with operations of a processor core (not shown). In some embodiments, the processor 100 includes additional clock domains (not shown) similar to write clock domain 102 and read clock domain 104 to support different processor cores and corresponding caches, with each clock domain having its own memory hierarchy including its own caches.

To maintain processing efficiency, the processor 100 provides different clock signals to the write clock domain 102 and the read clock domain 104 to synchronize their respective operations. In the depicted example, the clock signal provided to the write clock domain 102 is designated "WRITE CLOCK" and the clock signal provided to the read clock domain 104 is designated "READ CLOCK". As described further herein, the WRITE CLOCK and READ CLOCK signals are asynchronous, and therefore may have different frequencies and phases.

In particular, to generate the WRITE CLOCK and READ CLOCK signals, the processor 100 employs a clock generator 108. The clock generator 108 is a module configured to generate the WRITE CLOCK and READ CLOCK signals based on a timing signal (not shown) that is phase locked to a stable oscillating signal provided by a clock source (not shown), such as a reference crystal. In some embodiments, the clock generator 108 generates the WRITE CLOCK and READ CLOCK signals by selectively combining multiple clock signals based on control signaling that independently establishes the clock frequency for each clock signal. In the depicted example, the control signaling is provided by a controller 106.

The clock generator 108 identifies the frequencies for each of the WRITE CLOCK and READ CLOCK signals based on the control signaling from the controller 106. The clock generator 108 generates the WRITE CLOCK and READ CLOCK signals at their respective determined frequencies. In some embodiments, the clock generator 108 generates each of the WRITE CLOCK and READ CLOCK signals by independently combining phase-shifted versions of the timing signal to generate each clock signal at its respective frequency. The clock generator 108 sets and changes the frequency for each of the clock signals WRITE CLOCK and READ CLOCK independently of the other, such that the WRITE CLOCK and READ CLOCK signals are asynchronous.

Because of the asynchronicity of the clock signals WRITE CLOCK and READ CLOCK, the write clock domain 102 and read clock domain 104 cannot reliably communicate data synchronously, based on only one of their corresponding clock signals. Accordingly, to facilitate communication of data between the write clock domain 102 and the read clock domain 104, the processor 100 includes a FIFO 110 having a plurality of entries, wherein each entry is a separately addressable storage location that is accessed by both the write clock domain 102 and the read clock domain 104. For example, in some embodiments the FIFO 110 includes eight entries (i.e., it has a depth of 8). As used herein, the depth of the FIFO 110 refers to the number of entries of the FIFO 110. Thus, in some embodiments, the FIFO 110 has a depth of 4, 6, 8, 10, 12, 14, or 16. For ease of description, it is assumed that the FIFO 110 is employed to transfer data from the write clock domain 102 to the read clock domain 104 according to the techniques described herein.

To access the FIFO 110, the write clock domain 102 includes a write module 140 and the read clock domain 104 includes a read module 145. Each of the read/write modules 140 and 145 independently manages a set of pointers to access the FIFO 110. In particular, the write module 140 employs a write pointer 115 to indicate the next entry of the FIFO 110 to be written. In response to detecting an available slot in the FIFO 110 for transfer data to the read clock domain 104, the write module 140 asserts ready signal 165 for one clock cycle to indicate to external logic in communication with components of the processor 100 that an open FIFO entry will be available in the configured number of clocks in the write clock domain 102. After the configured number of clocks in the write clock domain 102 the write module 140 writes the data to the entry of the FIFO 110, then adjusts the write pointer 115 to point to the next entry of the FIFO 110. The write module 140 performs a write into the FIFO 110 whether or not there is valid data in order to maintain the required cadence. If the written entry is the last entry of the FIFO 110, the write module 140 adjusts the write pointer 115 to point to the first entry of the FIFO 110. Thus, assuming the FIFO 110 has eight entries, the write pointer 115 first points to entry zero, then to entry one, then to entry two, then to entry three, then to entry four, then to entry five, then to entry six, then to entry seven, and then returns to entry zero.

The read module 145 employs a read pointer 125 to indicate the next entry of the FIFO 110 to be read. In response to the read module 145 detecting that an entry can be read from FIFO 110, it asserts the heads up signal 160 for one clock cycle to external logic that a read from the FIFO 110 will occur in a configured number of read clock domain 104 cycles. After the configured number of read clock domain 104 cycles, the read module 145 reads the entry indicated by the read pointer 125, then adjusts the read pointer 125 to point to the next entry of the FIFO 110. The read module 145 performs a transfer whether or not there is valid data to transfer in order to maintain the proper cadence. As with the write pointer 115 described above, if the read entry is the last entry of the FIFO 110, the read module 145 adjusts the read pointer 125 to point to the first entry of the FIFO 110.

During a reset, both the write pointer 115 and the read pointer 125 are set to an initial value corresponding to an initial entry of the FIFO 110. The FIFO 110 is empty when the write pointer 115 and the read pointer 125 are equal. The FIFO 110 is full when the most significant bit (MSB) of the write pointer 115 and the read pointer 125 are different, but the remaining bits are equal. In some embodiments, the write pointer 115 and the read pointer 125 are encoded using a Gray code. The code distance between any two adjacent Gray code words is 1; thus, only one bit changes from one Gray count to the next. By using a Gray code to encode the write pointer 115 and the read pointer 125, it is not necessary to synchronize multiple changing bits on a clock edge.

Each of the write module 140 and read module 145 is synchronized by the clock signal corresponding to their clock domain (that is, clock signals WRITE CLOCK and READ CLOCK, respectively). To synchronize the read pointer 125 with the write clock domain 102, and to prevent meta-stability errors, the position of the write pointer 115 with respect to the entries of the FIFO 110 is transmitted to the read pointer 125 via a write pointer sync 135. Similarly, to synchronize the write pointer 115 with the read clock domain, and to prevent meta-stability errors, the position of the read pointer 125 with respect to the entries of the FIFO 110 is transmitted to the write pointer 115 via a read pointer sync 130. Each of the write pointer sync 135 and the read pointer sync 130 includes a number of flip flops (not shown) (the number of flip flops being referred to as the "sync depth") and maintains a delay for data written to or read from an entry of the FIFO 110.

In some embodiments, the write module 140 asserts a ready signal 165 indicating that the write module 140 is ready to output data to the FIFO 110. In some embodiments, the write module 140 asserts the ready signal 165 a predetermined number of write clock cycles before the write module 140 outputs data to the FIFO 110. In some embodiments, the predetermined number of write clock cycles is programmable. In some embodiments, the read module 145 asserts a heads up signal 160 a predetermined number of read clock cycles before the read module 145 is ready to read data from the FIFO 110. In some embodiments, the predetermined number of read clock cycles is programmable. The heads up signal 160 and the ready signal 165 allow interface logic on each side of the FIFO 110 to deliver and receive data efficiently, reduce latency, and ease critical timing paths. However, the accumulated delays from the read pointer sync 130, the write pointer sync 135, the heads up signal 160, and the ready signal 165 result in increased latency at the FIFO 110. In some embodiments, the write module 140 contains a pipeline of state elements (not shown) to delay the ready signal 165 and heads up signal 160.

In some embodiments, the write module 140 employs a commit write pointer 170 and the read module 145 employs a commit read pointer 180 to track additional write and read pointer states, respectively, that reflect the number of cycles with ready signal 165 and heads up signal 160 assertions that are outstanding to external logic but not yet committed to the FIFO 110 (referred to as the ready signal 165 delay and the heads up signal 160 delay, respectively). The independently configurable ready signal 165 delay of the commit write pointer 170 and the heads up signal 160 delay of the commit read pointer 180 allow external logic time to align data to be transferred with the cadence of available transfer slots in the FIFO 110, as controlled by the ratio of the write clock domain 102 to the read clock domain 104. In asynchronous mode, the ready signal 165 and heads up signal 160 delays add directly to the latency of data transfers. However, with properly calculated write offset 150 and read offset 155 values, the ready signal 165 and heads up signal 160 can be absorbed within the operations of the processor 100, resulting in reduced overall system clock domain transfer latency. In some embodiments, the commit write pointer 170 and the commit read pointer 180 use a chain of flip flops to create the delay needed between the clock cycle asserting the ready signal 165 and the heads up signal 160 to the time the write module 140 and the read module 145, respectively, perform the write or read operation.

To facilitate decreased latency and higher bandwidth, the controller 106 applies a write offset 150 to the write pointer 115 based on the ratio of the frequencies (or periods) of the write clock to the read clock. The controller 106 also applies a read offset 155 to the read pointer 125 based on the ratio of the frequencies (or periods) of the write clock to the read clock. In some embodiments, both the write offset 150 and the read offset 155 are positive integers. In some embodiments, one or both of the write offset 150 and the read offset 155 is a negative integer. The write offset 150 and the read offset 155 either advance (in the case of a positive offset) or retard (in the case of a negative offset) the limits of the write pointer 115 and read pointer 125, respectively, allowing the FIFO 110 to maintain full bandwidth by not stalling as the FIFO 110 waits for the write pointer 115 and the read pointer 125 to be synchronized across the write clock domain 102 and the read clock domain 104.

In some embodiments, the controller 106 calculates the write offset 150 and the read offset 155 based on the variables set forth below in Table 1.

TABLE 1

| Variable | Meaning |
| --- | --- |
| SyncDepth | Synchronizer depth |
| FifoDepth | Number of entries in FIFO |
| Rdy_m | Cycles early to deliver ready for data input |
| HeadsUp_m | Cycles early to deliver heads up for data output |
| ReadPeriod | Period of READ CLOCK |
| WritePeriod | Period of WRITE CLOCK |
| ShortPeriod | Period of the faster clock |
| LongPeriod | Period of the slower clock |

In some embodiments, the controller calculates the read offset 155 as:

$$\text{Read offset} = (\text{ReadPeriod} * (\text{SyncDepth} + \text{HeadsUp}\_m - 2.75)) / \text{LongPeriod}$$

In some embodiments, the controller 106 performs all calculations with integers except for the final divide, in which the remainder is used to round to the nearest integer.

In some embodiments, if the WritePeriod is less than or equal to the ReadPeriod, the controller calculates the write offset 150 as:

$$\text{Write offset} = (\text{WritePeriod} * (\text{SyncDepth} + Rdy\_m + 1) + 2 * \text{ReadPeriod} - \text{LongPeriod} * \text{FifoDepth}) / \text{LongPeriod}$$

In some embodiments, if the WritePeriod is greater than the ReadPeriod, the controller calculates the write offset 150 as:

$$\text{Write offset} = \text{SyncDepth} + Rdy\_m - 2$$

In some embodiments, these equations are only employed for ratios of the WRITE CLOCK frequency to the READ CLOCK frequency of 10-to-1 and 1-to-10. In some embodiments, the controller 106 calculates the write offset 150 and the read offset 155 twice, once for each direction through the FIFO 110.

In response to a change in the frequency of either the WRITE CLOCK or READ CLOCK, the controller 106 resets the values of the write offset 150 and the read offset 155 in a controlled manner. In some embodiments, in response to receiving a request to change a frequency, the controller 106 sets both the write offset 150 and the read offset 155 to zero to place the FIFO 110 in a simple asynchronous mode. The controller 106 then adjusts the WRITE CLOCK and/or the READ CLOCK to match the requested frequency, and determines an adjusted write offset 150 and read offset 155 based on the ratio of the adjusted frequencies of the WRITE CLOCK and the READ CLOCK.

FIG. 2 illustrates an example of the controller 106 of FIG. 1 applying a write offset 150 of zero to the write pointer 115 and a read offset 155 of zero to the read pointer 125 for writes to and reads from the FIFO 110 in accordance with some embodiments. In particular, FIG. 2 illustrates waveforms 240 and 241, corresponding to examples of the WRITE CLOCK and READ CLOCK signals, respectively. For the example of FIG. 2, the WRITE CLOCK and READ CLOCK signals have the same frequency. The waveforms 240 and 241 are each divided into cycles: cycles 250-259 of the WRITE CLOCK (waveform 240) and cycles 260-269 of the READ CLOCK (waveform 241). In addition, for each cycle 250-259, FIG. 2 illustrates the location of the FIFO 110 that is indicated by the write pointer 115 for data to be written by the write module 140, and for each cycle 260-269, FIG. 2 illustrates the location of the FIFO 110 that is indicated by the read pointer 125 for data to be read by the read module 145.

In the example of FIG. 2, the FIFO 110 has a depth of 8 entries, the read pointer sync 130 and write pointer sync 135 each have a depth of 4 flip flops, the heads up signal 160 specifies a 1 cycle delay, and the ready signal 165 specifies a 2 cycle delay. The FIFO 110 is empty when the write pointer 115 and the read pointer 125 are equal. The FIFO 110 is full when the most significant bit (MSB) of the write pointer 115 and the read pointer 125 (illustrated in FIG. 2 as having a value of either A or B) are different, but the remaining bits are equal. Thus, in the depicted example, the write module 140 writes to location 0 of the FIFO 110 during cycle 250, to location 1 of the FIFO 110 during cycle 251, and so on through cycle 257, when the write module 140 writes to location 7 of the FIFO 110, after which the write module 140 stalls at location 0 as the read of location 0 has yet to be communicated to the write module 140. In the depicted example, the read module 145 reads the data from location 1 of the FIFO 110 during cycle 266 of the READ CLOCK, which is 5 cycles after the data was written to location 1 of the FIFO 110.

Similar to the example of FIG. 2, in the example of FIG. 3 the WRITE CLOCK and READ CLOCK signals have the same frequency. FIG. 3 illustrates an example of the controller 106 of FIG. 1 applying a write offset 150 of 2 to the write pointer 115 and a read offset 155 of 2 to the read pointer 125 for writes to and reads from the FIFO 110 in accordance with some embodiments. Similar to FIG. 2, FIG. 3 illustrates waveforms 340 and 341, corresponding to examples of the WRITE CLOCK and READ CLOCK signals, respectively. The waveforms 340 and 341 are each divided into cycles: cycles 350-359 of the WRITE CLOCK (waveform 340) and cycles 360-369 of the READ CLOCK (waveform 341). In addition, for each cycle 350-359 FIG. 3 illustrates the location of the FIFO 110 that is indicated by the write pointer 115 for data to be written by the write module 140, and for each cycle 360-369, FIG. 3 illustrates the location of the FIFO 110 that is indicated by the read pointer 125 for data to be read by the read module 145.

As with the example of FIG. 2, in the example of FIG. 3, the FIFO 110 has a depth of 8 entries, the read pointer sync 130 and write pointer sync 135 each have a depth of 4 flip flops, the heads up signal 160 specifies a 1 cycle delay, and the ready signal 165 specifies a 2 cycle delay. The most significant bits (MSB) of the write pointer 115 and the read pointer 125 are illustrated in FIG. 3 as having a value of either A or B. In the depicted example, applying the write offset 150 of 2 to the write pointer 115 and the read offset 155 of 2 to the read pointer 125, the write module 140 writes to location 3 of the FIFO 110 during cycle 350, to location 4 of the FIFO 110 during cycle 351, and so on through cycle 354, when the write module 140 writes to location 7 of the FIFO 110, after which the write module 140 writes to location 0. In the depicted example, the read module 145 reads the data from location 3 of the FIFO 110 during cycle 363 of the READ CLOCK, which is 3 cycles after the data was written to location 3 of the FIFO 110. Thus, by applying the write offset 150 of 2 to the write pointer 115 and the read offset 155 of 2 to the read pointer 125, the controller 106 shortens the latency of the FIFO 110 from 5 cycles, as depicted in FIG. 2, to 3 cycles, as depicted in FIG. 3.

FIG. 4 illustrates an example of the controller 106 of FIG. 1 applying a write offset 150 of zero to the write pointer 115 and a read offset 155 of zero to the read pointer 125 for writes to and reads from the FIFO 110 in accordance with some embodiments. FIG. 4 illustrates waveforms 440 and 441, corresponding to examples of the WRITE CLOCK and READ CLOCK signals, respectively. For the example of FIG. 4, the READ CLOCK signal is 50% slower than the WRITE CLOCK signal. The waveforms 440 and 441 are each divided into cycles: cycles 450-459 of the WRITE CLOCK (waveform 440) and cycles 460-469 of the READ CLOCK (waveform 441). In addition, for each cycle 450-459, FIG. 4 illustrates the location of the FIFO 110 that is indicated by the write pointer 115 for data to be written by the write module 140, and for each cycle 460-469, FIG. 4 illustrates the location of the FIFO 110 that is indicated by the read pointer 125 for data to be read by the read module 145.

As with the examples of FIG. 2 and FIG. 3, in the example of FIG. 4, the FIFO 110 has a depth of 8 entries, the read pointer sync 130 and write pointer sync 135 each have a depth of 4 flip flops, the heads up signal 160 specifies a 1 cycle delay, and the ready signal 165 specifies a 2 cycle delay. The most significant bits (MSB) of the write pointer 115 and the read pointer 125 are illustrated in FIG. 4 as having a value of either A or B. Thus, in the depicted example, the write module 140 writes to location 3 of the FIFO 110 during cycle 450, to location 4 of the FIFO 110 during cycle 451, to location 5 of the FIFO 110 during cycle 452, and so on through cycle 456, when the write module 140 writes to location 7 of the FIFO 110, after which the write module 140 writes to location 0. In the depicted example, the read module 145 reads the data from location 5 of the FIFO 110 during cycle 466 of the READ CLOCK, which is 7 cycles of the WRITE CLOCK and 5 cycles of the READ CLOCK after the first data value A was written to location 5 of the FIFO 110.

Similar to the example of FIG. 4, in the example of FIG. 5 the READ CLOCK signal is 50% slower than the WRITE CLOCK signal. FIG. 5 illustrates an example of the controller 106 of FIG. 1 applying a write offset 150 of −1 to the write pointer 115 and a read offset 155 of 2 to the read pointer 125 for writes to and reads from the FIFO 110 in accordance with some embodiments. Similar to FIG. 4, FIG. 5 illustrates waveforms 540 and 541, corresponding to examples of the WRITE CLOCK and READ CLOCK signals, respectively. The waveforms 540 and 541 are each divided into cycles: cycles 550-559 of the WRITE CLOCK (waveform 540) and cycles 560-569 of the READ CLOCK (waveform 541). In addition, for each cycle 550-559 FIG. 5 illustrates the location of the FIFO 110 that is indicated by the write pointer 115 for data to be written by the write module 140, and for each cycle 560-569, FIG. 5 illustrates the location of the FIFO 110 that is indicated by the read pointer 125 for data to be read by the read module 145.

As with the example of FIG. 4, in the example of FIG. 5, the FIFO 110 has a depth of 8 entries, the read pointer sync 130 and write pointer sync 135 each have a depth of 4 flip flops, the heads up signal 160 specifies a 1 cycle delay, and the ready signal 165 specifies a 2 cycle delay. The most significant bits (MSB) of the write pointer 115 and the read pointer 125 are illustrated in FIG. 5 as having a value of either A or B. In the depicted example, applying the write offset 150 of −1 to the write pointer 115 and the read offset 155 of 2 to the read pointer 125, the write module 140 writes to location 2 of the FIFO 110 during cycle 550, to location 3 of the FIFO 110 during cycle 551, to location 4 of the FIFO during cycle 553, to location 5 during cycle 554, and so on through cycle 557, when the write module 140 writes to location 7 of the FIFO 110, after which the write module 140 writes to location 0 in cycle 559. In the depicted example, the read module 145 reads the data from location 5 of the FIFO 110 during cycle 565 of the READ CLOCK, which is 4 cycles of the WRITE CLOCK and 3 cycles of the READ CLOCK after the data was written to location 5 of the FIFO 110. Thus, by applying the write offset 150 of −1 to the write pointer 115 and the read offset 155 of 2 to the read pointer 125, the controller 106 shortens the latency of the FIFO 110 from 7 cycles of the WRITE CLOCK and 5 cycles of the READ CLOCK, as depicted in FIG. 4, to 4 cycles of the WRITE CLOCK and 3 cycles of the READ CLOCK, as depicted in FIG. 5.

Figure 6:
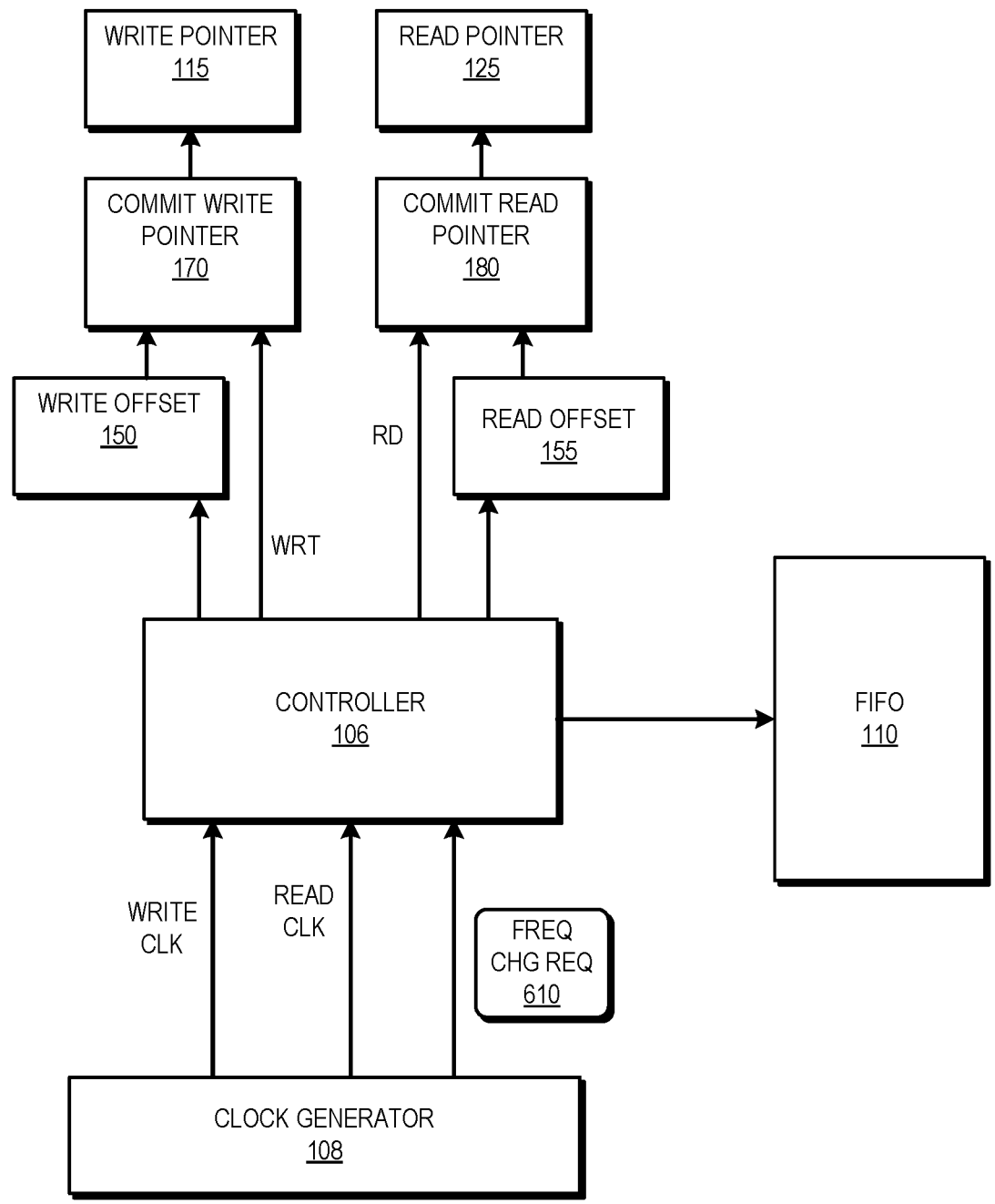
FIG. 6 is a block diagram of a FIFO controller of the processor of FIG. 1 in accordance with some embodiments.

FIG. 6 illustrates a block diagram of the controller 106 of FIG. 1 in accordance with some embodiments. In the depicted example, and as described further below, the controller 106 calculates and applies the write offset 150 and the read offset 155 to the commit write pointer 170 and commit read pointer 180, respectively. In turn, the commit write pointer 170 and the commit read pointer 180 directly control the write pointer 115 and the read pointer 125, respectively, through a pipeline of flip flops. In some embodiments, the depth of the pipeline of flip flops depends on the delays of the read and heads up signals (not shown). For example, if the ready depth is zero and the heads up depth is zero, then the commit write pointer 170 and the commit read pointer 180 are effectively removed.

By taking into account the relative frequencies of the WRITE CLOCK and READ CLOCK, as well as other parameters such as the depth of the FIFO 110, the depth of the read pointer sync 130 and the write pointer sync 135, and the number of cycles of the heads up signal 160 and ready signal 165, the controller 106 is able to anticipate the number of transfers into or out of each side of the FIFO 110 that will have taken place during the delay between the time at which a location of the FIFO 110 is written to by the write module 140 and the time that location of the FIFO 110 is read from by the read module 145. The controller 106 applies offset values for the write offset 150 and the read offset 155 that allow the commit write pointer 170 and the commit read pointer 180 to move beyond the raw values they would otherwise have indicated while maintaining a margin sufficient to ensure that the read module 145 reads to correct value from the location of the FIFO 110 indicated by the commit read pointer 180 and that the write module 140 does not overwrite a value at a location of the FIFO 110 that has not yet been read by the read module 145.

In the example of FIG. 6, the processor 100 includes the clock generator 108, the controller 106, the read offset 155, the commit read pointer 180, the read pointer module 125, the write offset 150, the commit write pointer 170, the write pointer module 115, and the FIFO 110. The read pointer module 125 is configured to store the read pointer for the read module (not shown). In response to assertion of a signal designated "RD", the commit read pointer 180 adjusts the read pointer module 125 to point to the next location of the FIFO 110, and the read pointer module 125 in turn provides the read pointer to the FIFO 110. In response, the FIFO 110 reads the location indicated by the read pointer and provides the read data to the read module.

The write pointer module 115 is configured similarly to the read pointer module 125 to write data to the FIFO 110. In particular, the write pointer module 115 stores the write pointer for the write module (not shown). In response to assertion of a signal designated "WRT", the commit write pointer 170 adjusts the write pointer module 115 to point to the next location of the FIFO 110, and the write pointer module 115 in turn provides the write pointer to the FIFO 110, along with the data provided by the write module (not shown). In response, the FIFO 110 writes the data location indicated by the write pointer.

The controller 106 is configured to generate the RD and WRT signals to read and write data from and to the FIFO 110 to calculate and apply the write offset 150 and the read offset 155 as described above with respect to FIGS. 1, 3, and 5. In particular, in the example of FIG. 6, the controller 106 receives a frequency change request 610 from the clock generator 108. The frequency change request 610 indicates that the clock generator 108 will change the frequency of one or both of the WRITE CLK and the READ CLK. The controller 106 calculates the new write offset 150 and read offset 155 based on the adjusted frequencies of the WRITE CLK and READ CLK. The controller 106 then waits for the write pointer 115 and the read pointer 125 to pass a first common entry of the FIFO 110 and then temporarily halts transfers of data from components of the processor 100 and empties the entries of the FIFO 110 that include data that has not been accessed by the read module. The controller 106 stops the write pointer 115 and the read pointer 125 at a second common entry of the FIFO 110 and applies the new write offset 150 and the new read offset 155. The controller 106 then restarts the write pointer 115 and the read pointer 150 and re-enables transfers of data from components of the processor 100.

Figure 7:
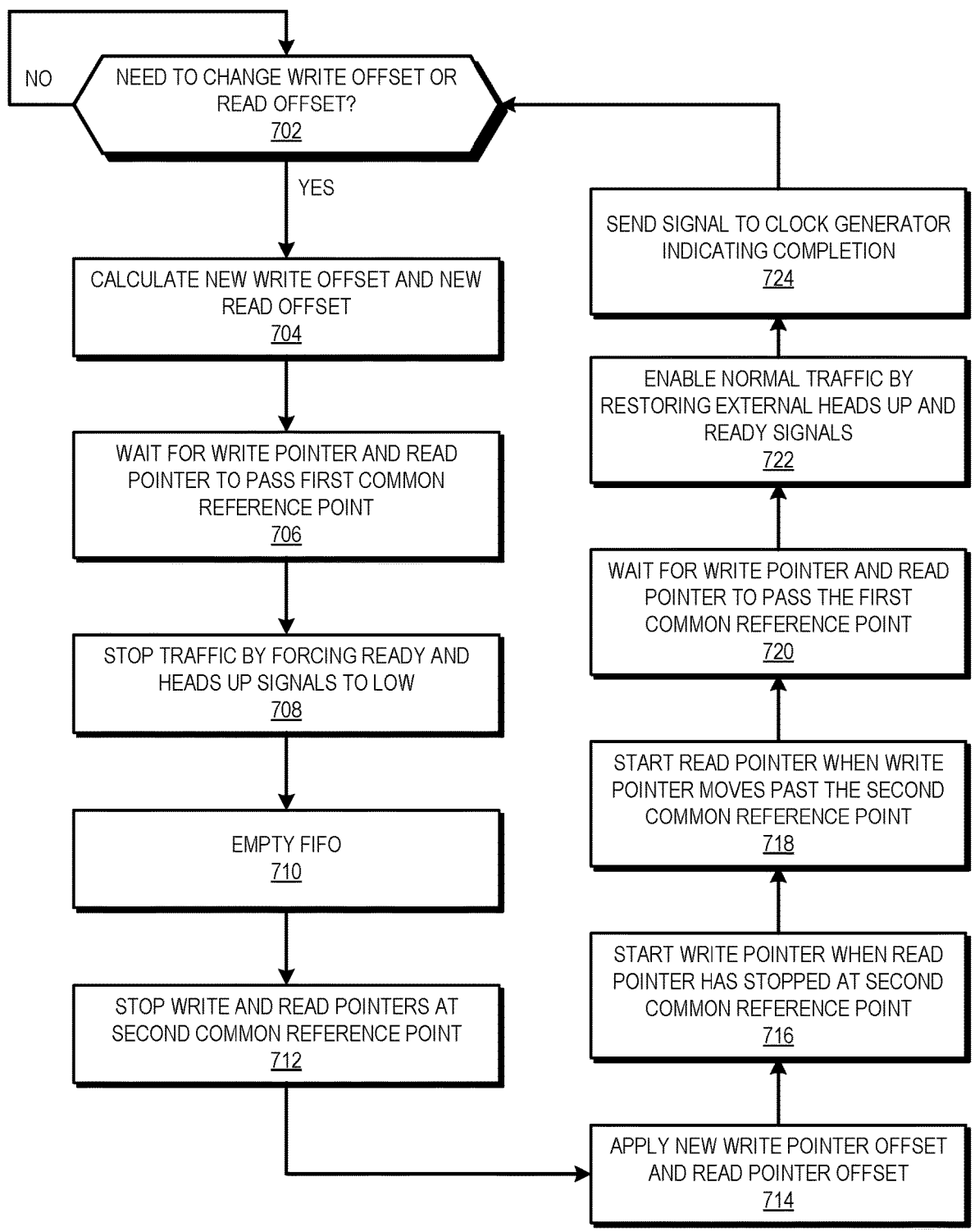
FIG. 7 is a flow diagram of a method of setting a write pointer offset and a read pointer offset for transferring data between clock domains at a FIFO in response to a frequency change of a clock signal for one or both of the clock domains in accordance with some embodiments.

FIG. 7 is a flow diagram of a method 700 of setting a write offset 150 and a read offset 155 for transferring data between clock domains at a FIFO in response to a frequency change of a clock signal for one or both of the clock domains in accordance with some embodiments. The method 700 is implemented in some embodiments of the processor 100 shown in FIG. 1. Controller 106 performs method 700 whenever new a new write offset 150 or a new read offset 155 are needed before and after one or both of WRITE CLK and READ CLK change frequency. Method 700 ensures no data is lost or duplicated when the write offset 150 and read offset 155 change by stopping transfers through the FIFO 110, flushing all pending entries from the FIFO 110, stopping the write pointer 115 and read pointer 125 at a fixed location, applying the new write offset 150 and read offset 155 values, restarting the write pointer 115 and the read pointer 125 in a controlled fashion, and finally resuming data transfers though the FIFO 110.

In some embodiments, the controller 106 operates two parallel instances of method 700, one for the write clock domain 102 and another for the read clock domain 104. At several points in method 700 the write pointer 115 and the read pointer 125 are required to operate in a coordinated fashion such that parallel versions in read clock domain 102 and write clock domain 104 of method 700 are in the same block 702 through 724 at the same time or nearly the same time as required for proper operation.

At block 702, the controller 106 determines if a frequency change is in progress and if a new write offset 150 and a read offset 155 are required. If not, the method flow returns to block 702. If a new write offset 150 and a read offset 155 are required, at block 704, the controller 106 calculates the new write offset 150 and read offset 155. At block 706, the controller 106 waits for the read pointer 115 and write pointer 125 to pass a first common reference point. The common reference point is a defined position in the FIFO 110 that the instances of method 700 in the write clock domain 102 and the read clock domain 104 agree upon. In some embodiments, the common reference point is the FIFO 110 entry 0A. In some embodiments, the common reference point is a FIFO 110 entry as tracked by the commit write pointer 170 and the commit read pointer 180. Use of the commit write pointer 170 and the commit read pointer 180 ensures that every pulse of ready signal 165 has a corresponding heads up signal 160 and that entries still in the FIFO 110 at the entry of block 708 will still be read by the read module 145 and have a corresponding pulse of heads up signal 160.

At block 708, after the write pointer 125 and the read pointer 115 have passed the first common reference point, the controller 106 forces the ready signal 165 and heads up signal 160 values low to inform components connected to processor 100 that no transfers are available. However, while components outside processor 100 are stalled, write pointer 115 and read pointer 125 continue to operate within processor 100 to perform method 700. At block 710, controller 106 drains any data in the FIFO 110 that is waiting to be read by the read module 145. In some embodiments, the forcing of ready signal 165 and heads up signal 160 low through the commit write pointer 170 and commit read pointer 180 ensures that any transfers through the FIFO 110 when method 700 reaches block 708 will still have a proper heads up signal 160 as the flip flop pipeline used inside the commit write pointer 170 and the commit read pointer 180 will contain the proper values to operate the write pointer 115 and read pointer 125, respectively, to prevent lost data.

At block 712, first the commit write pointer 170 and then write pointer 115 stop at a second common reference point. The commit read pointer 180 and the read pointer 125 then stop at the second common reference point. In some embodiments, the second common reference point is the FIFO 110 entry 0B. When the write pointer 115 and the read pointer 125 stop, the controller 106, at block 714, applies the new read write offset 150 and new read offset 155. At block 716, the controller 106 restarts the write pointer 115 upon detecting that the read pointer sync 130 has reached the second common reference point. At block 718, the read pointer 125 detects that the write pointer sync 136 moves past the second common reference point. The commit read pointer 180 bypasses the internal flip flop pipeline and begins moving the read pointer 125 and the commit read pointer 180 at the same time, advancing the commit read pointer 180 by the number of flip flops in the pipeline between the commit read pointer 180 and the read pointer 125. In embodiments with a commit read pointer 180, block 718 ensures the time differential between the write pointer 115 and the read pointer 125 is not skewed based on the commit read pointer 180 pipeline depth.

At block 720, the controller 106 waits for the write pointer 115 and the read pointer 125 to return to the first common reference point, giving time for the write pointer 115 and the read pointer 125 to settle to the proper time differential. At block 722, the controller 106 enables normal traffic by restoring the ready signal 165 and heads up signal 160 to their proper values for the new processor 100 configuration. At block 724, the controller 106 sends a signal to the clock generator 108 to indicate that method 700 is complete.

In some embodiments, the apparatus and techniques described above are implemented in a system including one or more integrated circuit (IC) devices (also referred to as integrated circuit packages or microchips), such as the multimedia system described above with reference to FIGS. 1-7. Electronic design automation (EDA) and computer aided design (CAD) software tools are used in the design and fabrication of these IC devices. These design tools typically are represented as one or more software programs. The one or more software programs include code executable by a computer system to manipulate the computer system to operate on code representative of circuitry of one or more IC devices to perform at least a portion of a process to design or adapt a manufacturing system to fabricate the circuitry. This code includes instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium includes any non-transitory storage medium, or combination of non-transitory storage media, accessible by a computer system during use to provide instructions and/or data to the computer system. Such storage media include, but are not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium, in one embodiment, is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium includes, for example, a magnetic or optical disk storage device, solid state storage devices such as Flash memory, a cache, random access memory (RAM) or other non-volatile memory device or devices, and the like. The executable instructions stored on the non-transitory computer readable storage medium are implemented, for example, in source code, assembly language code, object code, or other instruction format that is interpreted or otherwise executable by one or more processors.

Note that not all the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above about specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    at a first clock domain of a processor, incrementing a position of a write pointer with respect to a plurality of entries of a buffer based on a depth of the buffer and a first offset value;
    accessing, at a write module of the processor, a first entry of the plurality of entries of the buffer in response to the write pointer indicating the first entry;
    at a second clock domain of the processor, incrementing a position of a read pointer with respect to the plurality of entries of the buffer based on the position of the write pointer and a second offset value, the second offset value based on a ratio of a first frequency of a first clock signal of the first clock domain to a second frequency of a second clock signal of the second clock domain, the second clock signal asynchronous with the first clock signal; and
    accessing, at a read module of the processor, the first entry of the plurality of entries of the buffer in response to the read pointer indicating the first entry.

2. The method of claim 1, wherein the first offset value is based on the ratio of the first frequency to the second frequency.

3. The method of claim 1, wherein the first offset value is based on a depth of a synchronizer between the first clock domain and the second clock domain.

4. The method of claim 3, further comprising asserting a signal indicating that the write module will access the buffer, and wherein the first offset value is further based on a number of clock cycles of the first clock signal between assertion of the signal and the write module accessing of the buffer.

5. The method of claim 1, wherein the second offset value is further based on a depth of a synchronizer between the first clock domain and the second clock domain.

6. The method of claim 1, further comprising resetting the first offset value and the second offset value in response to a request to adjust the first frequency to a first adjusted frequency or the second frequency to a second adjusted frequency.

7. The method of claim 6, wherein resetting the first offset value and the second offset value comprises:
    determining a first adjusted offset value for the write pointer based on the ratio of the first adjusted frequency to the second adjusted frequency in response to the first adjusted frequency being higher than the second adjusted frequency;
    determining a second adjusted offset value for the read pointer based on the ratio of the first adjusted frequency to the second adjusted frequency;
    emptying the entries of the buffer that comprise data that has not been accessed by the read module;
    stopping the write pointer and the read pointer at a common entry of the buffer;
    incrementing the position of the write pointer based on the first adjusted offset value; and
    incrementing the position of the read pointer based on the second adjusted offset value.

8. A method, comprising:
    at a first clock domain of a processor, offsetting a position of a write pointer with respect to a first-in first-out buffer (FIFO) having a depth, based on a first offset value;
    at a second clock domain of the processor, offsetting a position of a read pointer with respect to the FIFO based on a second offset value, wherein the second offset value is based on a ratio of a first period of a first clock signal of the first clock domain to a second period of a second clock signal of the second clock domain;
    accessing, at a write module of the processor, a first entry of the FIFO based on the position of the write pointer;
    incrementing the write pointer with respect to the FIFO in response to accessing the first entry;
    reading, at a read module of the processor, from the first entry of the FIFO based on the position of the read pointer with respect to the FIFO; and
    incrementing the read pointer with respect to the FIFO in response to reading from the first entry.

9. The method of claim 8, wherein the first offset value is based on the ratio of the first period to the second period.

10. The method of claim 8, wherein the first offset value is based on a depth of a synchronizer between the first clock domain and the second clock domain.

11. The method of claim 10, further comprising asserting a signal indicating that the write module will access the buffer, and wherein the first offset value is further based on a number of clock cycles of the first clock signal between assertion of the signal and the write module accessing of the buffer.

12. The method of claim 8, further comprising resetting the first offset value and the second offset value in response to a request to adjust the first period to a first adjusted period or the second period to a second adjusted period.

13. The method of claim 12, wherein resetting the first offset value and the second offset value comprises:
   determining a first adjusted offset value for the write pointer based on the ratio of the first adjusted period to the second adjusted period in response to the first adjusted period being higher than the second adjusted period;
   determining a second adjusted offset value for the read pointer based on the ratio of the first period frequency to the second adjusted period;
   emptying the entries of the buffer that comprise data that has not been accessed by the read module;
   stopping the write pointer and the read pointer at a common entry of the buffer;
   incrementing the position of the write pointer based on the first adjusted offset value; and
   incrementing the position of the read pointer based on the second adjusted offset value.

14. A processor, comprising:
   a first-in first-out buffer (FIFO);
   a first clock domain comprising:
      a write pointer;
      a first synchronizer; and
      a write module configured to access a first entry of the FIFO in response to a position of the write pointer with respect to the FIFO, wherein the position of the write pointer is based on a depth of the FIFO and a first offset value;
   a second clock domain comprising:
      a read pointer;
      a second synchronizer; and
      a read module configured to access the first entry of the FIFO in response to a position of the read pointer with respect to the FIFO, wherein the position of the read pointer is based on the position of the write pointer and a second offset value; and
   a controller configured to determine the first offset value and the second offset value.

15. The processor of claim 14, wherein the controller is configured to determine the first offset value based on a ratio of a first frequency of a first clock signal of the first clock domain to a second frequency of a second clock signal of the second clock domain, the second clock signal asynchronous with the first clock signal.

16. The processor of claim 14, wherein the controller is configured to determine the first offset value based on a depth of the first synchronizer.

17. The processor of claim 14, wherein the write module is further configured to assert a signal indicating that the write module will access the buffer, and wherein controller is further configured to determine the first offset value based on a number of clock cycles of the first clock signal between assertion of the signal and the write module accessing of the buffer.

18. The processor of claim 14, wherein the controller is configured to determine the second offset value based on a ratio of a first frequency of a first clock signal of the first clock domain to a second frequency of a second clock signal of the second clock domain, the second clock signal asynchronous with the first clock signal.

19. The processor of claim 18, wherein the controller is configured to reset the first offset value and the second offset value in response to a request to adjust the first frequency to a first adjusted frequency or the second frequency to a second adjusted frequency.

20. The processor of claim 19, wherein the controller is further configured to:
   determine a first adjusted offset value for the write pointer based on the ratio of the first adjusted frequency to the second adjusted frequency in response to the first adjusted frequency being higher than the second adjusted frequency;
   determine a second adjusted offset value for the read pointer based on the ratio of the first adjusted frequency to the second adjusted frequency;
   empty the entries of the FIFO that comprise data that has not been accessed by the read module;
   stop the write pointer and the read pointer at a common entry of the FIFO;
   increment the position of the write pointer based on the depth of the FIFO and the first adjusted offset value; and
   increment the position of the read pointer based on the position of the write pointer and the second adjusted offset value.

* * * * *

UNITED STATES PATENT AND TRADEMARK OFFICE
CERTIFICATE OF CORRECTION

| | |
|---|---|
| PATENT NO. | : 10,592,442 B2 |
| APPLICATION NO. | : 15/837951 |
| DATED | : March 17, 2020 |
| INVENTOR(S) | : Richard Martin Born, David M. Dahle and Steven Kommrusch |

It is certified that error appears in the above-identified patent and that said Letters Patent is hereby corrected as shown below:

In the Claims

At Column 16 Line 9, please correct "and wherein controller" to be --wherein the controller--

Signed and Sealed this
Thirty-first Day of October, 2023

Katherine Kelly Vidal
*Director of the United States Patent and Trademark Office*